United States Patent Office 3,457,323
Patented July 22, 1969

3,457,323
POLYAMIDE-MODIFIED ORGANOPOLYSILOXANE COMPOSITION
Edward J. Stengle, Jr., Toledo, Ohio, assignor to Owens-Illinois, Inc., a corporation of Ohio
No Drawing. Filed Nov. 21, 1966, Ser. No. 595,642
Int. Cl. C08g 31/32, 31/09
U.S. Cl. 260—826   12 Claims

ABSTRACT OF THE DISCLOSURE

An organopolysiloxane composition is modified by a polyamide which is an alkoxyalkyl-substituted condensation polymer in which alkoxymethyl groups replace the amide hydrogen in the polyamide chain. The composition is used, for example, to form coatings that are clear, transparent and have outstanding flexural properties.

---

This invention relates to a polyamide-modified organopolysiloxane composition. More specifically, this invention relates to an organopolysiloxane composition wherein the flexural impact and adhesive properties of said composition are improved by the addition of small percentages of a polyamide (i.e., a condensation polymer containing repeating

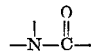

groups as an integral part of the polymer chain).

Blends of organopolysiloxane resins and polyamide resins are known in the prior art. For example, see United States Patent No. 2,983,700 to Rohm. However, the prior art does not disclose trifunctional organopolysiloxanes which contain polyamide additives. By the term "trifunctional organopolysiloxane resin," as used herein and in the appended claims, is meant an organopolysiloxane derived from siloxane-forming (siloxane-formable) trifunctional starting reactant(s). The polyamide modified organopolysiloxanes as utilized in the prior art are opaque and as such are not suitable as coating media for metals where it is desirous for the natural color of the metal to appear. In contrast, the modified organopolysiloxanes of this invention produce clear and transparent coatings. Accordingly, the natural beauty of the coated metal is clearly visible.

The primary object of this invention is the preparation of a clear, transparent modified trifunctional organopolysiloxane resin composition which has outstanding flexural properties.

Another object is the preparation of a superior coating composition.

Other objects of this invention include a process for the manufacture of the coating composition of this invention and a process for coating metal therewith.

Finally, the object of this invention include all the other novel features which will be obvious from the specification and claims at hand.

The starting material as used in this invention can be either a solid or liquid organopolysiloxane resin.

Organopolysiloxane compounds which are adapted for use in the filled compositions of the subject invention are produced by the hydrolysis and condensation of at least one compound embraced by Formula I (I)          $T_nSiZ_{(4-n)}$ wherein T independently generally represents a member such as alkyl, cycloalkyl, alkenyl and aryl. More specifically, T is independently a member such as alkyl, e.g., methyl, ethyl and propyl through hexyl (both normal and isomeric forms), cyclopentyl, cyclohexyl, vinyl, and the normal and isomeric forms of propenyl through hexenyl, and phenyl; Z independently represents an alkoxy group (e.g., methoxy through heptoxy); and $n$ is 1.

In Formula I, as given above for substituent Z, alkoxy groups are preferred because their hydrolysis products are not acidic, and therefore, the silane conjoint hydrolysis and condensation can be better controlled. Alkoxy groups of less than 5 carbon atoms are especially advantageous, because the rate of hydrolysis can be inconveniently slow when the organic hydrolyzable radicals(s) have a higher molecular weight (i.e., more carbon atoms).

The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Specific examples of compounds generically represented by Formula I which are adapted for use in this invention are methyltrialkoxysilanes such as methyltrimethoxysilane, methyltriethoxysilane, ethyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2-propoxy)silane, phenyltri(2-methyl-2-propoxy)silane, phenyltri(1-butoxy)silane, and phenyltri(2-butoxy)silane.

A preferred organosilane monomer adapted for use in this invention consists essentially of a compound represented by Formula II.

(II)

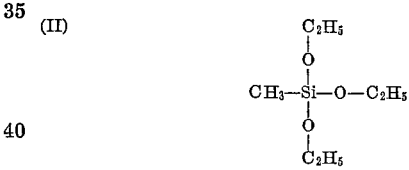

The concentration of water in the initial hydrolysis and condensation reaction mixture containing the compound as represented by Formula II above should be in the range of from about 1.5 moles to about 10 moles of water per mole of silane reactant. Preferably the amount of water used is from 1.5 to 5.0 moles, still more preferably from 1.5 to 3.0 moles, of water per mole of total silane. Assuming methyltrialkoxysilane is the only monomer, its complete hydrolysis and condensation can be represented as $$CH_3Si(OR)_3 + 3H_2O \rightleftarrows CH_3Si(OH)_3 + 3ROH$$

$$mCH_3Si(OH)_3 \rightleftarrows (CH_3SiO_{1.5})m + 1.5mH_2O$$

or overall $$mCH_3Si(OR)_3 + 1.5mH_2O \rightleftarrows (CH_3SiO_{1.5})m + 3mROH$$

where $m$ is a number corresponding to the degree of polymerization and is greater than 1. Thus, the lower theoretical limit of water is 1.5 moles per mole of silane. Solid heat-softenable organopolysiloxane resins of this invention can be prepared at this concentration, but further decrease in water content of the reaction mixture leads to polymers which are rubbery and soft, presumably due to incomplete hydrolysis and condensation. When the quantity of water is in the preferred range of about 1.5 moles to 5.0 moles of water per mole of silane monomer, the alkanol by-product formed during hydrolysis acts as a solvent for the other products and reactants, the initially heterogeneous reaction mixture becoming clear and homogeneous. This homogeneity is desirable, since it prevents resin precipitation and allows more uniform control of resin formation. If the water:silane ratio substantially exceeds 5:1, the alkanol formed is insufficient to convert the aqueous medium to a solvent for the reactants and products; therefore, resin precipitation can occur. Insolubility of resinous products at higher water concentrations can be overcome by adding a water-miscible organic solvent such as ethanol, etc. However, at water concentrations above about 10 moles of water per mole of silane monomer, gel formation can occur even if sufficient organic solvent is added to make the reaction mixture homogeneous. The exact upper limit of the water:silane ratio will depend on such factors as silanes used, acid content, time and temperature, etc. Thus, it cannot be set forth precisely, but can be determined by routine test in each case.

Some alkanol by-product must be retained in the reaction mixture during initial hydrolysis and condensation. It is believed that the alkanol formed in the manner indicated by the equations above slows the overall rate of hydrolysis and condensation. This control of the rate of resin formation prevents gel formation and allows preparation of homogeneously highly cross-linked polymers with good dimensional stability.

To avoid gelation and effect hydrolysis and polysiloxane formation of the compound represented by Formula II at a conveniently rapid rate, the acidity of the initial hydrolysis and condensation reaction mixture must be maintained within certain limits hereinafter set forth in detail.

A means of purifying the starting silane monomer II as described above and monomers III and IV as will be described hereinbelow, to insure the right acidity, is distillation from admixture of the monomers with a reagent which will convert acidic species present to non-volatile compounds. Thus distillation of the monomers from admixture with alkali-metal alkoxides such as sodium ethoxide or methoxide or aqueous dilute alkali or aqueous alkali-metal carbonate is usually suitable. The methods involving aqueous media are of less advantage when the monomer contains silicon-bonded methoxyl groups, because these species hydrolyze rapidly, causing substantial quantities of monomer to be lost during purification. It has also been found that some commercial monomers initially treated by this procedure to give materials of suitably low acidity later increase in acidity during hydrolysis, causing gelation.

A particularly preferred method of purification which avoids these difficulties is distillation from a metal hydride that is preferably lithium aluminum hydride. The hydride destroys all acidic hydrogen species present.

It will be apparent that the actual nature of the various acidic species in commercial methyltrialkoxysilanes and their reaction mixtures cannot always be specified. For convenience, acidity is expressed herein, unless otherwise specifically stated, as parts by weight of HCl per million parts by weight of methyl trialkoxysilane, plus water, or, as abbreviated, "p.p.m. hydrochloric acid" or "p.p.m. HCl." However, it is to be understood that this language is not intended to imply that HCl is the only or even one of the acidic species present. Acid content of the monomer alone, when determined, was measured as follows:

To 25 ml. of toluene was added 13 drops of a 0.04% methanol solution of bromcresol purple, and the resultant mixture was titrated to a blue-violet endpoint with 0.2 N potassium hydroxide. A 10.0-ml. sample of methyltrialkoxysilane was pipetted into the solution thus obtained, and the resultant mixture was titrated to the same blue-violet endpoint with 0.02 N potassium hydroxide; a similar 10.0 ml. sample of methyltrialkoxysilane was rapidly weighed. Under these conditions, acidity of the monomer alone is calculated as $A - 729 \, V/S$, where $A$ is acid content in parts by weight (grams) of HCl per million parts by weight (grams) of methyltrialkoxysilane (assuming entire sample is the silane), $V$ is volume of alkali used in second titration described, and $S$ is weight of sample in grams.

Initial hydrolysis and condensation is conveniently carried out by placing in a flask pure water, and methyltrialkoxysilane, whose acid content has been suitably adjusted by one of the means just described, and heating the resultant mixture under reflux. The initially cloudy reaction mixture clears on heating, usually within an hour, because alcohol formed as a hydrolysis by-product dissolves the other components of the mixture. A suitable degree of hydrolysis and condensation is usually obtained if reflux is allowed to proceed for about one to four hours after the mixture clears. This step can be carried out at lower temperatures, but the rate is substantially slower.

The upper limit of permissible acid content during this initial hydrolysis and condensation is that beyond which gel formation occurs. The lower limit is determined by the desired reaction time. In general, the minimum reaction time to obtain satisfactory products is about one hour of reflux. Maximum and minimum allowable acid contents vary with the ratio of methyltrialkoxysilane and water used. The lower theoretical water content is $Y/2$, where $Y$ is the average number of alkoxy groups attached to silicon throughout the mixture. Thus, when methyltrialkoxysilane is the sole silane constituent, the theoretical lower molar ratio of silane:water is 1:1.5. When the molar silane:water ratio is 1:1.5, the minimum allowable acid content is about 50 parts of HCl per million parts of total methyltrialkoxysilane and water, and the maximum is about 650–700 parts on this same basis. When the molar silane:water ratio is 1:3.0, the minimum allowable acid content ranges from a small positive amount which may be a very slight trace less than 1 p.p.m. HCl, e.g., 0.1–0.01 p.p.m. HCl; or it may be from 1 ppm HCl up to about 5 ppm HCl or a little higher such as 10 pp.m. HCl.

These limits have been carefully established but are necessarily subject to minor variation in each case, for several reasons. First, use of other alkoxysilanes as comonomers in amounts previously specified can reduce acid sensitivity, since methyltrialkoxysilanes are most acid labile, but the effect will generally be small. Second, extremely small quantities of impurities in a given sample, impractical to remove, can alter acid sensitivity slightly. Those factors, however, affect only the maximal and minimal extremes of allowable acid content, and the major portion of the suitable area indicated will be unchanged.

It is usually most convenient to reduce the acid content of the monomers to about zero weight part per million HCl by one of the methods previously described and, if necessary or desirable (as it usually is), then adjust the acidity of the initial reaction mixture by adding acid to the water used in the calculated amount required to impart the desired acidity to the starting mixture. For this purpose, hydrochloric acid is preferred. Organic acids such as phenol and formic acid can also be used.

Another preferred organosilane reactant material for use in accordance with this invention is a mixture of compounds as represented by Formulae III and IV:

(III)
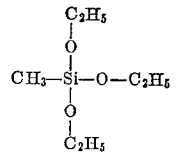

(IV)
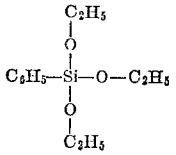

wherein $C_6H_5$ is phenyl. During the in situ hydrolysis and polymerization, compounds III and IV link together by conjoint hydrolysis and condensation to form a copolymer. The molar ratio of the compound as represented by Formula III to the compound as represented by Formula IV can be from 1:10 to 10:1 with a more preferred ratio being about 1:5 to 5:1. A most preferred composition is produced by the hydrolysis and condensation of about 2 moles of the compound as represented by Formula III with about one mole of the compound as represented by Formula IV.

To avoid premature gelation of the resins, the quantity of acid in the reaction mixture must be below about 0.01 mole of acid per mole of hydrolyzable silanol precursor. Thus, it may be of the same order of magnitude as hereinbefore described with reference to the production of organopolysiloxanes from silanes of the kind embraced by Formulae I and II. Similarly, a solvent, e.g., ethanol, can be added to render the reaction mixture homogeneous.

The preferred water concentration for consideration in the production of copolymers made from monomers represented by Formulae III and IV above is from about 1.5 to about 3 moles with a most preferred concentration being about 3 moles for every mole of total silane monomer present in the reaction mixture.

A further variation in the procedure can be achieved by hydrolyzing individually a hydrolyzable methyltrialkoxysilane and a hydrolyzable phenyltrialkoxysilane, and then combining the resultant hydrolysis products to form the initial reaction mixture described above.

The subject monomeric organosilane compounds that are represented by Formulae I, II, III and IV can be converted into the modified organopolysiloxane compositions of the present invention by the following general procedure. The organosilane compound or compounds are hydrolyzed and partially condensed at a temperature of from about 50° to about 80° C. for a period of time of from about 1 to about 10 hours, in the presence of at least a trace of acid and at least about 1:5 moles of water per mole of silane. This hydrolysis of compounds as represented by Formulae I to IV above is carried out in the presence of water as discussed above. The reaction then proceeds with distilling for a period of time of from about 1 to about 30 minutes to effect the removal of the by-product alcohol and excess water and thereby concentrate the solution of the partial condensation product of the above-described reaction. The concentration step effects the further condensation of the liquid organopolysiloxane partial condensation product. The concentrated organopolysiloxane product is then precured (advanced in cure without gelation) at a temperature of from about 90 to about 250° C. for a period of time of from about ½ to about 24 hours to provide a liquid siloxane partial condensation product that is capable of being further cured to a thermoset polymer. This precured product is then cured at a temperature of from about 90 to about 200° C. for a period of time of from about 4 to about 168 hours.

The invention at hand is also adapted to utilize a powdered heat-softenable solvent-soluble form of the above-described organopolysiloxane resins. These heat-softenable solvent-soluble organopolysiloxane resins can be produced by the alteration of the curing step. More specifically, if the partial curing step is carried out at a temperature of from 10–20° C. below the gel point of the resin, on cooling to room temperature a heat-softenable solvent-soluble resin results. Likewise, a heat-softenable solvent-soluble resin will result when condensation and partial curing steps are carried out as described above, but the cure is interrupted before complete polymerization is effected. Upon formation these heat-softenable solvent-soluble materials are white powders. These powders can be converted to a solid material by the application of at least one of heat and pressure. Temperatures of from about 250° F. to about 500° F. can be utilized along with any convenient pressure.

The composition and preparation of the monomeric organosilane compounds and their subsequent polymerization and copolymerization are fully discussed in copending United States patent application, Ser. No. 306,344 filed Sept. 3, 1963 (now abandoned), U.S. patent application, Ser. No. 370,684 filed May 27, 1964 (now abandoned), U.S. patent application, Ser. No. 520,893 filed Jan. 17, 1966 (now abandoned) and U.S. patent application, Ser. No. 545,579 filed Apr. 27, 1966 now U.S. Patent No. 3,395,117, issued July 30, 1968, these applications having an assignee that is common with the assignee of this invention.

The formulation, polymerization and application of the monomeric organosilane compounds and organopolysiloxane compositions of this invention are carried out in the presence of a solvent such as methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

Modifying polyamides which are adapted for use in accordance with this invention are represented by Formulae V and VI:

V 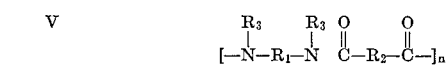

VI 

where $R_1$ and $R_2$ are independently straight chain alkylene $C_1$–$C_{20}$, and $R_3$ is hydrogen and/or $CH_2OR$ groups being randomly distributed along the polymer chain. A preferred range for the ratio of H to $CH_2OR$ is from about 3:1 to about 1:1. A most preferred ratio is about 2:1, R being hydrogen, straight chain alkyl $C_1$–$C_6$ or aryl, $n$ is an integer such that the number average molecular weight of the resulting polymer is from about 2,000 to about 50,000, a more preferred range being from about 8,000 to about 12,000, with a most preferred molecular weight being about 10,000.

One preferred polyamide which is adapted for use in the subject organopolysiloxane composition is a polyamide sold under the trademark BCI 819 by the Belding Chemical Industries.

The primary structure of this preferred polyamide is as represented in Formula VII:

VII 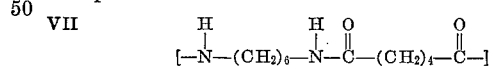

This polyamide is prepared from hexamethylenediamine and adipic acid, with methoxymethyl and some methylol substitution occurring at the amide hydrogen of the 6—6 backbone chain.

Analysis of this polyamide shows that the methoxyl concentration in methoxymethyl ($>$N—$CH_2$—$OCH_3$) is from about 7.75 to about 8 percent:Methylol substitution ($>$N—$CH_2$—OH) is from about 0.5 to about 2.84 percent; the total substitution of N—H groups in the polymer is from about 3.8 percent to about 46 percent; and the number average molecular weight is about 9,800 to about 11,750.

The above polyamides are described as alkoxyalkyl-substituted condensation polymers wherein alkoxymethyl groups replace the amide hydrogen in the polyamide chain, rendering the polymer soluble in lower alcohols, phenols and solvent systems containing co-solvents. Water improves the solubility of these polyamides; hence, water is usually present in a 5% concentration. These polyamides exhibit high tensile strength, toughness, and flexibility, properties which are advantageous in modifying the physical characteristics of the organopolysiloxane coatings of this invention.

The polyamide is dissolved in ethanol containing 5% water by heating to a temperature of from about 60 to about 65° C., and the resultant solution is used as a solvent for the precured or partially condensed organopolysiloxane or added to the prepolymer.

The composition of the invention at hand contains a small amount, more particularly a small but effective plasticizing amount, of the polyamide modifier. For example, there can be present in the composition from about 0.5 to about 10 weight percent polyamide. A more preferred range of the polyamide additive is from about 0.5 to about 5 percent. A most preferred concentration consists essentially of a polyamide addition of about 1 to 2 percent. The foregoing percentages are based on the total weight of organopolysiloxane solids and polyamide modifier.

It is not clearly understood exactly how the polyamide additive coacts with the organopolysiloxane resin to improve the flexural, adhesive and other properties of the latter so that there is obtained a tough, flexible, modified organopolysiloxane resin. However, the presently available evidence indicates that, during the curing sequence, the polyamide chemically reacts (probably through the methoxymethyl and methylol groups present therein) with the incompletely condensed or partly cured organopolysiloxane resin whereby the properties of the fully-cured organopolysiloxane resin are materially improved. In other words, the property-improvement that is attained probably is due to the condensation or bonding of the long polyamide chain via its functional alkoxy and/or methylol groups with or onto available hydroxyl groups of the incompletely condensed organopolysiloxane.

Tables I and II show viscosity data on two different organopolysiloxane solutions in butanol to which have been added various percentages of polyamides. These data show that as the reflux time of an organopolysiloxane-polyamide composition increases, there is a corresponding increase in the viscosity of the resulting mixture. This viscosity increase is thought to be due to reaction between the polyamide and the organopolysiloxane.

The polyamide resin utilized in these tests was BCI 819 as is described above.

The organopolysiloxane resin used in the test of Table I was the preferred composition, and the hydrolyzable silanes used in its preparation is described in Formulae III and IV above.

The organopolysiloxane resin used in the test of Table II was the preferred composition, and the hydrolyzable silane employed in making it is described in Formula II above.

TABLE I

| Polyamide percent | 0 (cps.) | 1% (cps.) | 3 (cps.) | 5 (cps.) |
|---|---|---|---|---|
| Viscosity after 0 hr. reflux | 18 | 30 | 35 | 30 |
| Viscosity after 1 hr. reflux | 18 | 30 | 45 | 30 |
| Viscosity after 2 hr. reflux | 20 | 35 | 48 | 40 |
| Viscosity after 3 hr. reflux | 20 | 35 | 50 | 45 |
| Viscosity after 6 hr. reflux | 20 | 35 | | |

TABLE II

| Polyamide percent | 0 (cps.) | 1 (cps.) | 2 (cps.) | 3 (cps.) | 5 (cps.) |
|---|---|---|---|---|---|
| Viscosity after 1 hr. reflux | 30 | 35 | 40 | 50 | 70 |
| Viscosity after 2 hr. reflux | 30 | 45 | 60 | 60 | 90 |
| Viscosity after 3 hr. reflux | | | | | 100 |
| Viscosity after 4 hr. reflux | 30 | | | | |

Of novel significance is the fact that the polyamide is compatible with the clear water white thermosetting organopolysiloxane resin, and as such does not affect the light-transmission characteristics of the organopolysiloxane at the concentrations utilized. Likewise, the modification of this invention advantageously affects the viscosity and flow characteristics of the subject organopolysiloxane resins and thus enhances the ease with which various substrates can be coated with said organopolysiloxane resins.

When unmodified thermosetting organopolysiloxane compositions as described above are utilized as a coating media for various substrates, the coating thickness must be carefully controlled to prevent a coating thickness that will have a tendency to craze and crack. Generally, with the conventional organopolysiloxane, the coating thickness cannot exceed about 0.5 mil. In contrast, when the coating composition of this invention is utilized, the coating thickness is not critical due to the fact that the polyamide imparts flexibility and improved film continuity properties. These desirable properties are the result of the fact that the components are compatible.

The coating composition of this invention exhibits exceptional weathering characteristics. These exceptional weathering characteristics are thought to be due to the improved adhesion, flexibility of the subject coating composition and the excellent ultraviolet and visible light transmission characteristics of the modified compositions of this invention.

The polyamide addition of this invention of under one percent does not affect the ability of the organopolysiloxane base resin to transmit light. The polyamide addition of this invention tends to produce a composite resin which is harder than the organopolysiloxane base resin. Accordingly, the resulting organopolysiloxane resins are advantageous for protective and decorative coating applications.

The coating composition of this invention can be advantageously modified with small percentages of an organic acid. These small percentages of an organic acid should regulate the pH of the coating composition to a pH of from about 4.0 to about 4.5. It is feasible that these conditions enhance the tendency of the polyamide to react with the trifunctional organopolysiloxane of this invention. For use on copper, a citric acid addition is preferred. In addition to the above-described properties, citric acid, when used on copper, tends to stabilize the natural copper color. Up to 2 percent of an organic acid can be present in the subject composition. This acid addition is discussed in detail in an application entitled "Organopolysiloxane Composition," Ser. No. 595,577, said application having an assignee which is common with the assignee of this invention and being filed concurrently with the subject application.

It is within the purview of this invention to add to the compositions of this invention compatible materials which do not affect the basic and novel characteristics of the composition of this invention. Among such materials are coloring agents, including dyes and pigments, fillers, and similar additives. Additives such as antioxidants, antistatic agents, stabilizers, and antifoaming agents, may also be added. The upper limit of the quantity of additives is usually about 50 weight percent of the product.

With regard to these additions, it should be specifically noted that various percentages of glare-reducing components such as silica can be added to the subject organopolysiloxane composition. These additions generally convert a high gloss surface into a surface which has a dull, flat appearance.

When used as a coating, the composition of the subject inveniton can be applied to many types of surfaces. For example, said composition can be applied to plastics such as (1) vinyl resins formed by the polymerization of vinyl halides or by the copolymerization of vinyl halides with unsaturated polymerizable compounds, e.g., vinyl esters, $\alpha,\beta$-unsaturated ketones, $\alpha,\beta$-unsaturated esters, $\alpha,\beta$-unsaturated aldehydes and unsaturated hydrocarbons such as butadienes and styrenes; (2) poly-$\alpha$-olefins such as polyethylene, polypropylene, polyisoprene, and the like, including copolymers of poly-$\alpha$-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde-engendering substances such as paraformaldehyde; (13) modified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc. This list is not meant to be limiting or exhaustive, but merely to illustrate the wide range of polymeric materials which may be employed in the present invention.

The coating composition of this invention can also be applied to woods such as walnut, pine, mahogany, cherry, spruce, etc.

With regard to inorganic surfaces, the coating composition of this invention can be applied to surfaces such as soda lime glass, borosilicate glass, aluminosilicate, fused silica, lead glass, optical crown glass, tellurium dioxide glass, arsenic trisulfide glass, quartz glass, porcelain, beryllia alumina magnesium aluminosilicate low expansion ceramics and lithium alumino-silicate low expansion ceramics. The compositions of this invention are particularly suited for the treatment and finishing of glass surfaces where a hard, protective, chemically durable, wear-resistant surface is desirable.

Finally, the coating composition of this invention can be applied to metals or alloys of the following such as magnesium, titanium, zirconium, vanadium, chromium, tungsten, manganese, iron including steel and stainless steel, copper, nickel, vanadium, platinum, cobalt, silver, gold, zinc, cadmium, aluminum, including annodized aluminum, tin, lead, etc.

The coating composition of this invention is particularly advantageous wherein the surface being coated is to be utilized for functional or decorative purposes.

The following examples will illustrate the subject invention. These examples are given for the purpose of illustration and not for purposes of limiting this invention. (All parts and percents are given by weight unless otherwise specified.)

EXAMPLES 1–14

The data for these examples are listed in Tables III, IV and V. The compositions of these examples were prepared in accordance with the following description. An organopolysiloxane reaction product was prepared by the hydrolysis and condensation of an organosilane monomer or combination of monomers as shown in Formulae II, III and IV above. Specifically, whenever a mixture of methyl and phenyl monomers was utilized a copolymer was prepared in accordance with the description given in conjunction with Formulae III and IV above. The hydrolysis and condensation products were then rapidly heated to 140° C. with stirring in an open beaker to remove the alcohol by-product and water. The resulting partially condensed organopolysiloxane was held at 100 to 120° C.; a solubilized polyamide component was prepared by heating said polyamide with alcohol in a reaction flask until solution was complete. This solubilized component was then added to the partially condensed organopolysiloxane with stirring. When solution was complete, the beaker was covered and allowed to cool to room temperature. Any solvent lost by evaporation was replaced and, if organic acids were utilized, they were added at this time. The solution was then filtered prior to use. The composition at this level of polymerization was primarily a partially condensed organopolysiloxane of intermediate molecular weight containing a polyamide. In the presence of a common solvent and elevated temperatures, it is believed a co-condensation product is produced which reflects desirable properties characteristic of the individual polymers.

The polyamides utilized in these examples were BCI 819, as is described above and Zytel 61 which is sold by the E. I. du Pont de Nemorus and Co. This resin is described in U.S. Patent Nos. 2,285,009 and 3,029,538. It is thought that Zytel 61 is a soluble nylon, which is an interpolymer condensation product of hexamethylene diamine, adipic acid, sebacic acid and caprolactam.

Surface preparation of metal test panels

Copper.—A commercial copper cleaner such as "Twinkel" was used to remove metal oxides and produce a bright, lustrous surface. The cleaner was removed with a hot water rinse, dried with a cellulose tissue and given a final solvent rinse consisting of 75 parts toluene, 24 parts acetone, and 1 part butyl acetate. The above solvent solution is referred to as a copper cleaning solution by Chase Brass and Copper Company. A copper cleaner that is a solution of 18 parts by volume of ferric chloride (42% solution), 32 parts by volume of concentrated nitric acid, and 200 parts by volume of water also can be used to clean the copper surface as described for instance on page 20 of Concise Guide to Structural Adhesives by Werner H. Guttmann, Reinhold Publishing Corporation, New York, N.Y., 1961.

Aluminum.—The aluminum test panels were rinsed with the above copper cleaning solvent and wiped dry with a cellulose tissue.

Stainless.—The stainless test panels were immersed in 0.5% "Alkanox" detergent solution at 180° F. for 10 minutes, rinsed with distilled water, and wiped dry with a cellulose tissue.

Coating procedure

Organopolysiloxane-polyamide solutions were applied to metal test panels using a dip-coat technique. The coating or film thickness deposited was controlled using a dip-coating apparatus with a controlled adjustable speed drive. (1.8 to 22 seconds per inch of travel.) The test panel, usually 3 x 6 inches, was immersed into a receptacle containing the coating solution, allowed to stand 2 to 3 seconds to assure uniform wetting and extracted at a speed designed to produce the required thickness. Solution viscosity based on solvent used and solids concentration is an important parameter. The coated panels were allowed to air-dry 1–5 minutes for solvent evaporation and then cured in a convection or air-circulating oven at temperatures of 90 to 225° C. from 2 minutes to 48 hours.

Testing procedure

The outdoor weathering tests were conducted, using an Atlas XW-R Weather-Ometer. These tests were conducted in accordance with ASTM–G1499–64, entitled "Operating Light and Water Exposure Apparatus," using carbon arcs. E–42 standard spec., 121499–64 covers specific variations as used in these tests.

The conditions of the test were Type 1 Ia Exposure of Plastics. The testing sequence was as follows:

Cycle 1.—Test specimens 3 x 9⅛ inch were mounted on a cylinder and the coated side exposed to a light source of six carbon arcs for 50 minutes. This light source generates the proper wave length at a black panel temperature of 148±2° F.

Cycle 2.—After exposure to the light source for 50 minutes, the cycle was changed to a dark environment, void of light, maintained at 100% R.H. Simultaneously, the back side of the panel was continuously sprayed with 45° F. water, causing a condensation of water on the coated side. After 60 minutes, the cycle was again changed to the light source. The total time to failure includes both the light and dark cycles.

In the dielectric breakdown test of the coatings on metal substrates, the voltage was supplied by a G.E. 15 kv. transformer 60 v. capacity equipped with an ammeter and current limiting resistor. These tests were generally conducted in accordance with ASTM D149–61. However, the voltage increase was manually controlled, not programmed, as is the above-described ASTM test. Likewise, spherical electrodes were used, not flat discs as in the ASTM specification.

A general description of the test is as follows: A clamp electrode is attached to the uncoated portion of the test panel, the spherical electrode placed on the coating, and the voltage increased manually until a breakdown occurs. The breakdown was conducted as a function of coating thickness. Both dry and wet surfaces were evaluated.

The impact flexibility of the subject coatings was tested with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

The flexibility was tested by bending the coated panel 180° back on itself.

The viscosity in centipoises (cps.) was measured with a RVF Brookfield viscometer in accordance with ASTM–2196–63T—"Rheological Properties of Non-Newtonian Liquids."

The coating hardness on metal substrates was determined with Model C Sward Hardness Rocker. This instrument generally tests the hardness and drying time of coating materials by responding to damping differences in resilient surfaces. These tests were conducted in accordance with ASTM D2134–62T—"Softening of Organic Coatings by Plastic Compositions."

The adhesion of the coatings to metal substrates was tested with the Scotch tape test wherein the tape is uniformly applied to a coated surface which has been cross-cut with a razor knife, then pulled off rapidly at 180°. Coatings which exhibit good adhesion do not peel, whereas those not bonded to the substrate peel in the cross-cut area where the coating is not continuous.

In addition to the above-described test the color retention of the metal substrate after coating and curing was noted. In Tables III, IV and V, "very good" indicates no discoloration, "good" indicates slight discoloration and "poor" indicates substantial discoloration.

TABLE III.—G.E. IMPACT (PERCENT ELONGATION) OF 0.5 MIL COATINGS ON 0.020" ALUMINUM FLAT STOCK

Percent solids, 50 in ethanol containing 5% water.
Cure, 5 min. at 220° C. (air circulating oven)

| | Composition (parts) | | | | | G.E. impact flexibility, percent elongation |
|---|---|---|---|---|---|---|
| | Organopolysiloxane | | | polyamide | | |
| | Methyl | Phenyl | BCI 819 | Zytel 61 | Solvent | |
| Example: | | | | | | |
| 1 | 66 | 33 | 1 | | 100 | 10 |
| 2 | 66⅔ | 33⅓ | | | 100 | 2 |
| 3 | 99 | | 1 | | 100 | 5 |
| 4 | 100 | | | | 100 | 0 |
| 5¹ | 26⅔ | 13⅓ | | 2 | 60 | 10 |

¹ 42% solids in butanol.

TABLE IV.—ADHESION, FLEXIBILITY, DIELECTRIC AND SWARD HARDNESS PROPERTIES OF 0.4 TO 0.5 MIL COATINGS ON COPPER, ALUMINUM, STAINLESS, AND BONDERITE STEEL FLAT STOCK

Percent solids, 25–50 in ethanol containing 5% water and 1% citric acid

| Ex. | Composition (parts) | | | Solvent | Cure temp. (° C.) | Cure time (min.) | Substrate | Adhesion (scotch tape test) | Flexibility 180° bend | Dielectric breakdown (volts) | | Sward hardness |
|---|---|---|---|---|---|---|---|---|---|---|---|---|
| | Organopolysiloxane | | Polyamide BCI 819 | | | | | | | Dry | Wet | |
| | Methyl | Phenyl | | | | | | | | | | |
| 6 | 66 | 33 | 1 | 100 | 175C | 30 | Copper | No peeling | No cracking | 2,500–3,200 | 300–950 | 52–56 |
| 7 | 66 | 33 | 1 | 100 | 220AC | 3 | Aluminum | do | do | | | 50 |
| 8 | 66 | 33 | 1 | 100 | 220AC | 3 | Stainless | do | do | | | 60 |
| 9 | 66 | 33 | 1 | 100 | 220AC | 3 | Bonderite steel. | do | do | | | 40 |
| 10 | 63⅓ | 31⅔ | 5 | 100 | 175C | 15 | Copper | do | do | 3,000–4,000 | 1,000–2,000 | 60 |
| 11¹ | 66⅔ | 33⅓ | | 100 | 175C | 15 | do | do | Cracks | 3,500 | 1,000–1,500 | 45–50 |
| 12 | 99 | | 1 | 300 | 175C | ²12 | do | do | No cracking | 1,200–3,500 | Conductive | 50 |
| 13 | 95 | | 5 | 300 | 175C | ³7 | do | do | do | 2,800–3,500 | 300–800 | 40–45 |
| 14* | 100 | | | 100 | 175C | 15 | do | do | Cracks | 2,000–2,500 | 500–1,000 | 30–35 |

¹ Controls.
² and ³ = double coatings:

| | (²) | (³) |
|---|---|---|
| First coat | 2 min. | 2 min. |
| Second coat | 10 min. | 5 min. |

C = Convection oven.
AC = Air circulating oven.

TABLE V.—WEATHEROMETER PROPERTIES OF 0.45-0.5 MIL COATINGS ON COPPER, ALUMINUM AND STAINLESS (0.020″) FLAT STOCK

Percent solids 50 in ethanol containing 5% water and 1% citric acid

| Example | Composition (parts) | | | | Atlas XW-R weatherometer resistance (failure time, hours) |
|---|---|---|---|---|---|
| | Organopolysiloxane | | Polyamide BCI 819 | Solvent | |
| | Methyl | Phenyl | | | |
| 11 | 99 | | 1 | 100 | >1,400 on copper.[1] >2,000 on stainless.[1] >604 on aluminum. |
| 12 | [2] 100 | | | 100 | <100 on copper. |
| 13 | 66 | 33 | 1 | 100 | 146 on aluminum. |
| 14 | [2] 66⅔ | 33⅓ | | 100 | <100 on copper. |

[1] No failures, samples removed from test.
[2] Controls.

What is claimed is:

1. A method of making a modified organopolysiloxane composition, the method comprising the steps of:
   (I) heating a mixture of
      (A) a silane which is a member selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms;
      (B) at least a trace of acid and at least about 1.5 moles of water for every mole of total silane present, at a temperature of from about 50° to about 80° C. for a period of time of from about 1 to about 10 hours;
   (II) adding a polyamide resin to the product of Step I, the polyamide resin being at least one member of the group represented by the general formulae:

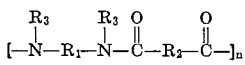

and

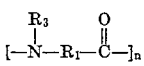

wherein $R_1$ and $R_2$ are independently straight chain alkylene $C_1$–$C_{20}$; wherein $R_3$ is hydrogen or $CH_2OR$; the ratio of H to $CH_2OR$ is from about 3:1 to about 1:1; R is hydrogen, straight chain alkyl $C_1$–$C_6$ or aryl; and $n$ is an integer such that the number average molecular weight of the resulting polymer is from about 2,000 to about 50,000; and
   (III) curing the product of step II by heating to a temperature of from about 90 to 200° C. for a period of time from about 4 to about 168 hours.

2. A method of making a modified organopolysiloxane composition, the method comprising the steps of:
   (I) heating a mixture of
      (A) a silane which is a member selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms;
      (B) at least a trace of acid and at least about 1.5 moles of water for every mole of total silane present, at a temperature of from about 50° to about 80° C. for a period of time of from about 1 to about 10 hours;
   (II) concentrating the liquid siloxane partial condensation product from step I to remove some but not all volatile material including alkanol by-product and some water and to obtain a liquid residue;
   (III) adding a polyamide resin to the product of step II, the polyamide resin being at least one member of the group represented by the general formulae:

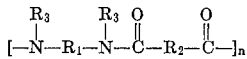

and

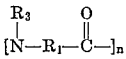

wherein $R_1$ and $R_2$ are independently straight chain alkylene $C_1$–$C_{20}$; wherein $R_3$ is hydrogen or $CH_2OR$; the ratio of H to $CH_2OR$ is from about 3:1 to about 1:1; R is hydrogen, straight chain alkyl $C_1$–$C_6$ or aryl; and $n$ is an integer such that the number average molecular weight of the resulting polymer is from about 2,000 to about 50,000; and
   (IV) curing the product of step III by heating to a temperature of from about 90 to 200° C. for a period of time of from about 4 to about 168 hours.

3. A method of making a modified organopolysiloxane composition, the method comprising the steps of:
   (I) heating a mixture of
      (A) a silane which is a member selected from the group consisting of methyltrialkoxysilane, ethyltrialkoxysilane, and mixtures of methyltrialkoxysilane and phenyltrialkoxysilane; and in which the alkoxy group contains from 1 to 6 carbon atoms;
      (B) at least a trace of acid and at least about 1.5 moles of water for every mole of total silane present, at a temperature of from about 50° to about 80° C. for a period of time of from about 1 second to about 60 minutes;
   (II) concentrating the liquid siloxane partial condensation product from step I to remove some but not all volatile material including alkanol by-product and some water and to obtain a liquid residue;
   (III) precuring the product of step II at a temperature of from about 10° to about 40° C. below the gel point of the resin for a period of time of from about 1 second to about 60 minutes;
   (IV) adding a polyamide resin to the product of step III, the polyamide resin being at least one member of the group represented by the general formulae:

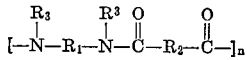

and

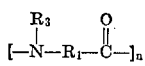

wherein $R_1$ and $R_2$ are independently straight chain alkylene $C_1$–$C_{20}$; wherein $R_3$ is hydrogen or $CH_2OR$; the ratio of H to $CH_2OR$ is from about 3:1 to about 1:1; R is hydrogen, straight chain alkyl $C_1$–$C_6$ or aryl; and $n$ is an integer such that the number average molecular weight of the resulting polymer is from about 2,000 to about 50,000; and
   (V) curing the product of step IV by heating to a temperature of from about 90 to 200° C. for a period of time of from about 4 to about 168 hours.

4. A method as defined in claim 1, wherein the silane is methyltriethoxysilane, and the composition contains from about 0.5 to about 10 percent by weight of the polyamide resin.

5. A method as defined in claim 1 in which the silane is methyltrialkoxysilane.

6. A method as defined in claim 1 in which the silane is a mixture of methyltrialkoxysilane and phenyltrialkoxysilane.

7. A method as defined in claim 1 in which the polyamide resin is present in a concentration of from about 0.5 to about 2 percent by weight.

8. The method as defined in claim 1 in which the polyamide resin has a primary structure represented by the formula:

$$[-\underset{|}{\overset{H}{N}}-(CH_2)_6-\underset{|}{\overset{H}{N}}-\overset{O}{\overset{\|}{C}}-(CH_2)_4-\overset{O}{\overset{\|}{C}}-]$$

said polyamide being prepared from hexamethylenediamine and adipic acid, with methoxymethyl and some methylol substitution occurring at the amide hydrogen of the 6—6 backbone chain;
said polyamide having a number average molecular weight of from about 9,800 to about 11,750; and
the concentration of the said polyamide in the said composition being about 1 percent by weight thereof.

9. A composition produced by the process defined in claim 21.

10. An article having a metallic surface that is coated with a composition prepared as defined in claim 1.

11. A method as defined in claim 1 in which the polyamide resin is represented by the general formula:

$$[-\underset{|}{\overset{R_3}{N}}-R_1-\overset{O}{\overset{\|}{C}}-]_n$$

12. A method as defined in claim 1 in which the polyamide resin is represented by the general formula:

$$[-\underset{|}{\overset{R_3}{N}}-R_1-\underset{|}{\overset{R_3}{N}}-\overset{O}{\overset{\|}{C}}-R_2-\overset{O}{\overset{\|}{C}}-]_n$$

References Cited

UNITED STATES PATENTS

| | | | |
|---|---|---|---|
| 2,823,195 | 2/1958 | Shorr et al. | 260—824 |
| 2,983,700 | 5/1961 | Rohm | 260—824 |
| 3,261,881 | 7/1966 | Christenson et al. | 260—826 |
| 3,288,754 | 11/1966 | Green | 260—824 |
| 3,318,971 | 5/1967 | Chloupek et al. | 260—826 |
| 3,395,117 | 7/1968 | Burzynski et al. | 260—46.5 |

SAMUEL H. BLECH, Primary Examiner

U.S. Cl. X.R.

117—123, 124, 132, 138.8, 145, 148, 161; 260—29.4, 33.4, 37, 39, 46.5, 72, 78, 448.2, 448.8, 824

UNITED STATES PATENT OFFICE
CERTIFICATE OF CORRECTION

Patent No. 3,457,323                                            July 22, 1969

Edward J. Stengle, Jr.

It is certified that error appears in the above identified patent and that said Letters Patent are hereby corrected as shown below:

Column 1, line 56, "object" should be -- objects --. Column 3 line 50, "dried" should be -- dride --; line 65, "0.2" should be -- 0.02 --. Column 5, line 6, insert a comma after "10:1"; line 39, "1:5" should be -- 1.5 --. Column 6, line 7, insert -- ) -- after "doned". Column 8, line 64, "inveniton" should be -- invention --. Column 10, line 7, "Nemorus" should be -- Nemours --; line 15, "Twinkel" should be -- Twinkle --. Column 14, line 9, there should be a bond in the formula before the N - should be -- [-N --; line 13, insert -- of -- between "ratio" and "H"; line 34, "1 second to about 60 minutes" should be -- 1 to about 10 hours --. Column 15, line 15, "claim 21" should be -- claim 1 --.

Signed and sealed this 24th day of March 1970.

(SEAL)
Attest:

EDWARD M. FLETCHER, JR.                           WILLIAM E. SCHUYLER, JR
Attesting Officer                                         Commissioner of Patents